(12) United States Patent
Eldredge et al.

(10) Patent No.: US 8,130,888 B2
(45) Date of Patent: Mar. 6, 2012

(54) CALIBRATING A PHASE DETECTOR AND ANALOG-TO-DIGITAL CONVERTER OFFSET AND GAIN

(75) Inventors: Adam B. Eldredge, Austin, TX (US);
Jeffrey S. Batchelor, Austin, TX (US);
Gary Hammes, Topeka, KS (US)

(73) Assignee: Silicon Laboratories Inc., Austin, TX (US)

( * ) Notice: Subject to any disclaimer, the term of this patent is extended or adjusted under 35 U.S.C. 154(b) by 132 days.

(21) Appl. No.: 12/562,360

(22) Filed: Sep. 18, 2009

(65) Prior Publication Data

US 2010/0008459 A1 Jan. 14, 2010

Related U.S. Application Data

(63) Continuation of application No. 11/026,206, filed on Dec. 29, 2004, now Pat. No. 7,609,798.

(51) Int. Cl.
*H04L 7/00* (2006.01)
(52) U.S. Cl. .......................................... 375/355; 375/326
(58) Field of Classification Search .................. 375/355, 375/326
See application file for complete search history.

(56) References Cited

U.S. PATENT DOCUMENTS

| | | | |
|---|---|---|---|
| 6,178,213 B1 | 1/2001 | McCormack et al. | 375/355 |
| 6,463,109 B1 | 10/2002 | McCormack et al. | 375/355 |
| 6,630,868 B2 * | 10/2003 | Perrott et al. | 331/17 |
| 6,657,488 B1 | 12/2003 | King et al. | 330/9 |
| 6,741,846 B1 | 5/2004 | Welland et al. | 455/260 |
| 6,856,206 B1 | 2/2005 | Perrott | 331/25 |
| 7,148,758 B1 | 12/2006 | Ross et al. | 331/17 |
| 2003/0053576 A1 * | 3/2003 | Cao | 375/375 |
| 2004/0012424 A1 | 1/2004 | Peng | 327/157 |
| 2004/0232995 A1 | 11/2004 | Thomsen et al. | 331/2 |

FOREIGN PATENT DOCUMENTS

WO WO 2004/100380 A1 11/2004

OTHER PUBLICATIONS

Si5010—Product Brief. Silicon Laboratories. Dec. 2004.
"Data conversion in SONET/SDH systems", A. Muhlschein. Electronics Engineer. Jun. 2000.
"A 5-Gb/s 0.25μm CMOS Jitter-Tolerant Variable-Interval Oversampling Clock/Data Recovery Circuit". Lee, Sang-Hyun; Moon-Sang Hwang, Youngdon Choi, Sungjoon Kim, Young-June Park, and Gijung Ahn. *IEEE Journal of Solid-State Circuits*, vol. 37, No. 12, pp. 1822-1830. Dec. 2002.
"Rate-Independent CDR Chip Locks In At Up to 2.7 Gbits/s". Mannion, Patrick. *Electronic Design*. www.elecdesign.com. Mar. 20, 2000.
OC-48 Optical Networking Solutions—Solutions Guide. Silicon Laboratories. May 2003.
Si5022/23 Multi-Rate Sonet/SDH CDR IC with Integrated Limiting Amplifier—Product Brief, Silicon Laboratories. May 2001.

* cited by examiner

*Primary Examiner* — Kevin Kim
(74) *Attorney, Agent, or Firm* — Trop, Pruner & Hu, P.C.

(57) ABSTRACT

The present invention includes apparatus and methods to calibrate a phase detector and an analog-to-digital converter (ADC) offset and gain. In one such embodiment, an apparatus includes a phase detector to generate an error pulse and a reference pulse, a combiner to combine the pulses, and an ADC to receive the combined pulses, where the ADC has a full scale set by an average of the reference pulse. Still further, a calibration loop may be coupled between the output of the ADC and the phase detector to generate and provide a phase adjust signal to reduce or eliminate phase offsets. Other embodiments are described and claimed.

16 Claims, 6 Drawing Sheets

CALIBRATING A PHASE DETECTOR AND ANALOG-TO-DIGITAL CONVERTER OFFSET AND GAIN

This application is a continuation of U.S. patent application Ser. No. 11/026,206 now U.S. Pat. No. 7,609,798 filed Dec. 29, 2004 entitled "CALIBRATING A PHASE DETECTOR AND ANALOG-TO-DIGITAL CONVERTER OFFSET AND GAIN," the content of which is hereby incorporated by reference.

FIELD OF THE INVENTION

The present invention relates to data communication circuits, and more specifically to such circuits including a phase detector.

BACKGROUND

Communication systems often transmit data with a clock embedded in a data stream, rather than being sent as a separate signal. When the data stream is received, a clock and data recovery circuit (CDR) recovers the embedded clock and retimes the received data to the recovered clock. Typically, a phase-locked loop (PLL) is used to perform the clock recovery operation. Such a PLL typically includes a phase detector, which receives the input data signal and a clock signal from a voltage-controlled oscillator (VCO). The phase detector generates an error signal, which is a function of the phase difference between the input data signal and the VCO clock signal. The phase detector may also include additional circuitry to generate the reconstructed data.

The phase detector, oftentimes a linear phase detector, is used to determine an optimal phase sampling point for the incoming data eye. However, such phase detectors rely on the matching of delays between data and clock paths. Accordingly, these phase detectors are notorious for having large phase offsets that change with process. Accordingly, a need exists to calibrate out systematic phase offsets of a phase detector.

In a typical high-speed linear phase detector, exclusive-OR (XOR) logic gates are used to generate output currents (I) that include an error pulse and a reference pulse that are provided to an integrating capacitor, C. The gain of the phase detector can be expressed as:

$$K_{PD} = \frac{V_{PD}}{\Delta\phi}(s) = \frac{I}{2\pi sC} \quad [1]$$

where $\Delta\phi$ is a change in phase. However, the I/C ratio does not track well from silicon wafer to silicon wafer. Thus phase detectors fabricated on different wafers may have widely varying I/C ratios and accordingly varying gains. Such gain variations cause jitter transfer and jitter tolerance bandwidths to undesirably vary.

Conventional linear phase detectors also include latches to store and pass data. A delay inherent in the latch from the input clock to the Q output of the latch (i.e., a delay from the clock input to output of the latch) adds an offset to the error pulse generated in the phase detector. This is because the Q output of the latch is input to an XOR along with the incoming data. Typically, this offset is reduced by inserting a delay into the data path of the incoming data before it is input to the XOR. However, it is very difficult to match this delay to the clock-to-Q delay of the latch. These unmatched delays cause non-optimal phase sampling due to offsets in the phase detector.

A need thus exists to reduce gain errors of a phase detector and related components, such as an analog-to-digital converter (ADC). Furthermore, a need exists to reduce or eliminate offsets in a phase detector.

SUMMARY OF THE INVENTION

In various embodiments, the present invention may provide apparatus and methods for reducing gain errors of a phase detector and an ADC, as well as reducing or eliminating offsets in the phase detector. In one such embodiment, the present invention includes a phase detector to generate an error pulse and a reference pulse, a combiner to combine the pulses into a phase detector pulse, and an ADC that has its full scale set by an average of the reference pulse.

In another embodiment, an apparatus may include a phase detector to generate a phase detector pulse, an ADC coupled to receive the phase detector pulse, and a calibration loop to generate a phase adjust value to force a filtered value of the ADC output to substantially zero. This phase adjust value may then be stored and used during normal operation to reduce or remove phase offsets.

Still another embodiment includes a method of calibrating a phase detector. The method may include sweeping a phase of a sampling clock across a data eye during phase detector calibration and filtering a digital value corresponding to an output of the phase detector. This filtered value may be fed back into the phase detector until a desired calibration value is obtained, corresponding to a phase adjust value.

Embodiments of the present invention may be implemented in appropriate hardware, firmware, and software. To that end, one embodiment may be implemented in an integrated circuit having an amplifier and a phase detector, ADC, and calibration loop, such as described above. Still other embodiments may include a system including such an integrated circuit along with additional components, such as an additional amplifier used to convert incoming optical energy into voltage signals.

DETAILED DESCRIPTION

Figure 1:
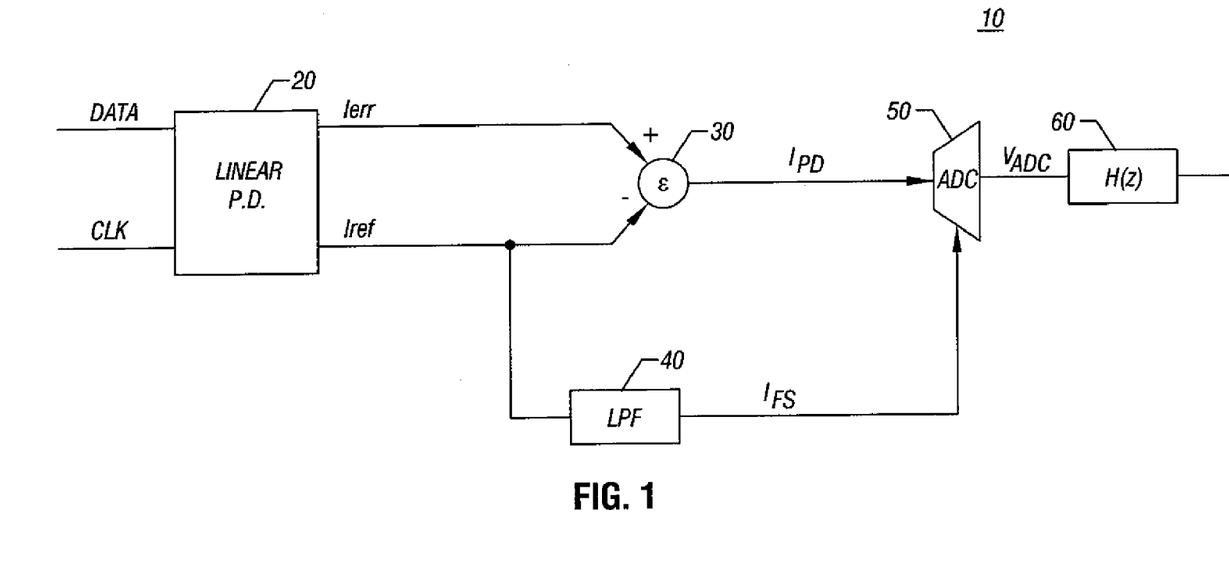
FIG. 1 is a block diagram of a portion of a clock and data recovery circuit in accordance with one embodiment of the present invention.

Referring to FIG. 1, shown is a block diagram of a portion of a clock and data recovery (CDR) circuit in accordance with one embodiment of the present invention. More specifically, FIG. 1 shows a phase detector and a related analog-to-digital converter (ADC) and digital filter to generate a control voltage (e.g., a voltage controlled oscillator (VCO) control voltage) from an incoming data path.

As shown in FIG. 1, circuit 10 includes a linear phase detector 20, which receives incoming data and a clock signal. In one embodiment, the incoming data may be received from a limit amplifier (LA) or an automatic gain control (AGC) amplifier, which may be within an integrated circuit (IC) package including a CDR. While not shown in FIG. 1, the clock signal (CLK) may be generated in the CDR from the incoming data and be fed back to phase detector 20.

Phase detector 20 may be a high-speed linear phase detector having an error output and a reference output. More specifically, phase detector 20 may provide output currents $I_{err}$ and $I_{ref}$. These values represent, respectively, an error value and a reference value. As shown in FIG. 1, $I_{err}$ and $I_{ref}$ are coupled to a summing block 30. In turn, summing block 30 outputs a current $I_{PD}$ equal to the value of $I_{err}$–$I_{ref}$. This current is in turn coupled to an ADC 50, which converts the incoming current into a digital voltage, $V_{ADC}$, which is provided to a digital filter 60. The digitally filtered value may be provided to other circuitry in the CDR (not shown in FIG. 1) to recover the clock.

In various embodiments, the full scale of ADC 50 may be set by the long-term average of the reference pulse. Specifically, as shown in FIG. 1, $I_{ref}$ is provided to a low-pass filter (LPF) 40 that provides a current signal, $I_{FS}$, to set the full scale of ADC 50. LPF 40 may have a bandwidth much lower than that of an associated phase-locked loop (PLL) or digitally-locked loop (DLL). For example, the filter bandwidth may be approximately 40 kHz, while the loop bandwidth operates at approximately 10 MHz. In such manner, the gain of phase detector 20 and ADC 50 may be limited to the matching of current sources $I_{FS}$ and $I_{ref}$. This matching is typically very good. Furthermore, because filtering is done in the digital domain, poles, zeroes and gain can all be well controlled. Still further, digital filtering allows the gain, poles and zeroes to change easily and provides for the realization of very low frequency poles/zeroes. In contrast, low frequency analog poles and zeroes typically require large off-chip capacitors.

Figure 2:
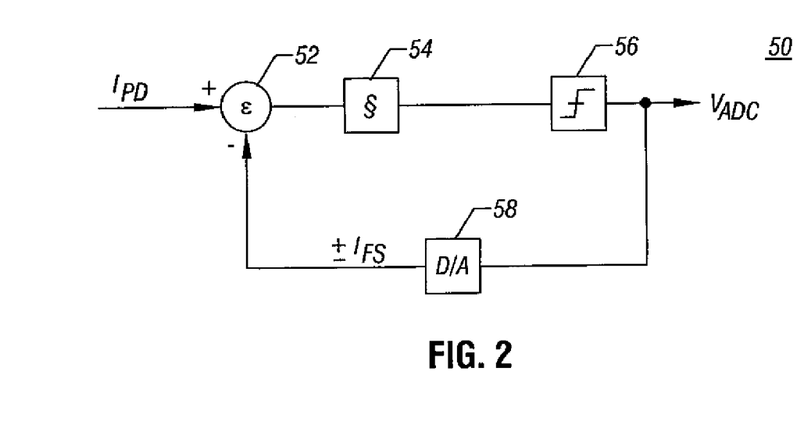
FIG. 2 is a block diagram of a sigma-delta analog-to-digital converter in accordance with one embodiment of the present invention.

While different embodiments may use different types of ADCs, in one embodiment, a sigma-delta (ΣΔ) converter may be used. More specifically, a first-order continuous-time sigma-delta converter may be implemented. The ΣΔ converter may be a one-bit converter, in some embodiments. Referring now to FIG. 2, shown is a block diagram of a sigma-delta ADC in accordance with one embodiment of the present invention. As shown in FIG. 2, ADC 50 may receive the incoming current $I_{PD}$ at a summing block 52, where it is combined with the output of a digital-to-analog (D/A) converter 58, which feeds back either a positive or negative full scale current signal $\pm I_{FS}$. In turn, summing block 52 is coupled to an integrator block 54 and a comparator block 56, which outputs a discrete time and amplitude voltage, $V_{ADC}$, having a gain equal to the reference current divided by the full scale current, $I_{ref}/I_{FS}$. In such manner, the gain of phase detector 20 and ADC 50 only depends on current matching between these current sources. That is, the gain does not depend on an I/C ratio. Because the full-scale calibration of phase detector 20 and ADC 50 runs continuously, any changes due to temperature variations may be tracked out. While shown in the embodiment of FIG. 2 as a ΣΔ converter, in other embodiments a binary weighted or other such converter may be used.

In addition to calibrating the gain of a phase detector and ADC, embodiments may further calibrate any offset of the phase detector. In various embodiments, such an offset in the phase detector may be reduced or eliminated by scaling the error current, $I_{err}$, by a phase adjust signal, $P_{ADJ}$. In other embodiments, the reference current, $I_{ref}$, instead may be scaled by this phase adjust signal.

Figure 3:
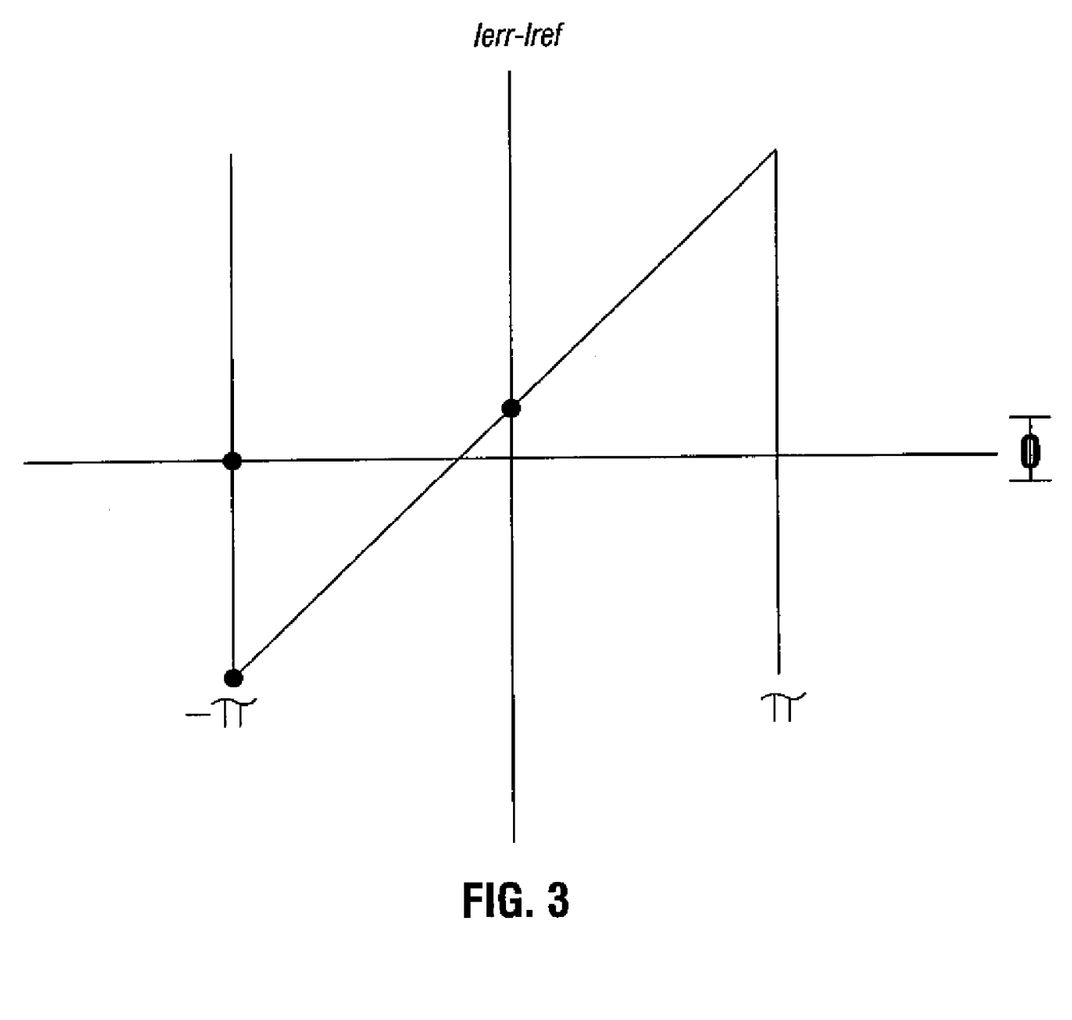
FIG. 3 is a phase diagram in accordance with one embodiment of the present invention.

Referring now to FIG. 3, shown is a phase diagram in accordance with one embodiment of the present invention. The phase diagram of FIG. 3 corresponds to a calibration phase, where the phase of the sampling clock is swept across the data eye. As shown in FIG. 3, the value of the error current ($I_{err}$) minus the reference current ($I_{ref}$) linearly increases. This linear relationship shows that at a zero phase value, there is an offset between the reference current and the error current. This offset may thus be removed using the phase adjust value obtained during calibration. The reference current may be a fixed current, representative of a delay between the input of a latch within a phase detector and the output therefrom, i.e., a half-clock cycle. In contrast, the error current varies with the change in phase during a calibration phase. Specifically, when sampling at the beginning of the data eye, a small error exists, whereas at the end of the data eye a larger error pulse exists.

Figure 4:
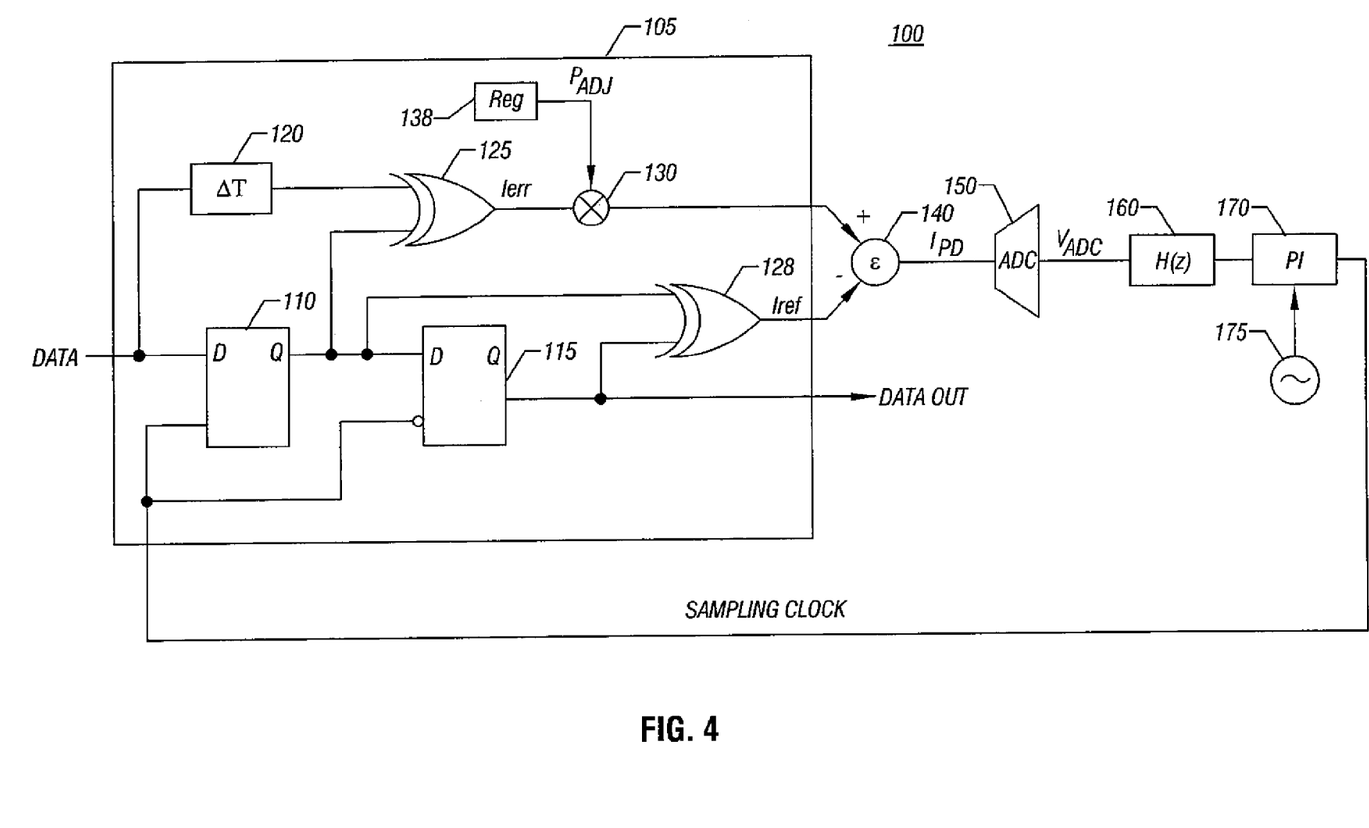
FIG. 4 is a block diagram of a circuit in accordance with one embodiment of the present invention.

Referring now to FIG. 4, shown is a block diagram of a circuit 100 in accordance with one embodiment of the present invention. As shown in FIG. 4, circuit 100 includes a phase detector 105, which receives incoming data at a first sampler, namely a first latch 110, which may be a D-type latch. The incoming data is further provided to a delay circuit 120 to delay the incoming data before it is provided to a first XOR 125. Delay circuit 120 need not be accurately matched to the clock-to-Q delay of first latch 110, as any resulting phase offset may be reduced or eliminated as described herein.

First latch 110 may be clocked by the sampling clock, which is further provided to clock a second latch 115 (inverted on the clock input to latch 115). The output of first latch 110 is coupled to second latch 115 and to first XOR 125 to generate the error current $I_{err}$, which is provided to a multiplier 130, where it is multiplied by the phase adjust signal, $P_{ADJ}$. In such manner, $I_{err}$ is scaled by the phase adjust signal to eliminate any offset in phase detector 105. While shown with this configuration in FIG. 4, in other embodiments multiplier 130 may be coupled to an output of a second XOR 128. As shown in FIG. 4, the phase adjust signal may be stored in a register 138 within phase detector 105, although in other embodiments, the value may be stored in another location.

Similarly, second latch 115 has its output coupled to second XOR 128. Second XOR 128 also receives the output of first latch 110 as its other input. As a result, second XOR 128 generates the reference current, $I_{ref}$. The output of second latch 115, which corresponds to the incoming data, is also output from circuit 100 for use as desired in a given system.

The output of multiplier 130 and second XOR 128 are combined in a summing block 140 to generate a phase detector current ($I_{PD}$). As used herein, the term "combining" means that some type of mathematical operation is performed on two or more values. For example, two values may be combined via addition, subtraction, multiplication, or the like. As shown, the reference signal (i.e., $I_{ref}$) may be subtracted from the error signal (i.e., $I_{err}$) to generate the phase detector current. In some embodiments, a phase detector may incorporate a summing block to generate the phase detector current.

The phase detector current is coupled to an ADC 150, which generates a digital voltage ($V_{ADC}$), provided to a digital filter 160. The output of digital filter 160 is provided to a phase interpolator 170, which generates the recovered sampling clock therefrom. As shown, phase interpolator 170 receives a clock signal from a voltage control oscillator (VCO) 175. While not shown in FIG. 4, it is to be understood that one or more of the components in circuit 100 may be negative gain stages such that a negative feedback loop is formed.

In order to determine the optimal value for the phase adjust signal, the device may first perform a calibration routine. In one embodiment, the calibration routine may be performed when device is first powered up.

Figure 5:
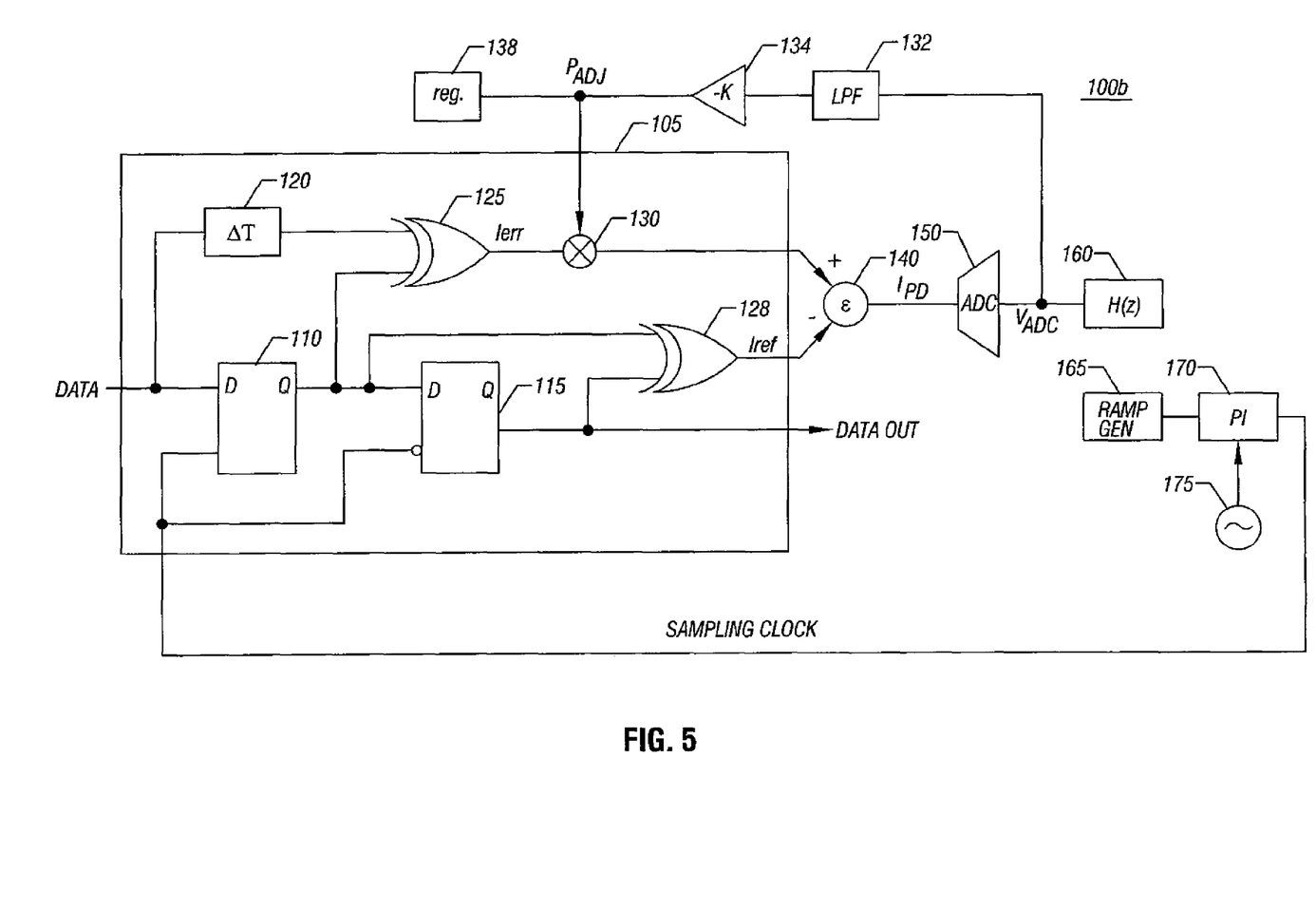
FIG. 5 is a block diagram of a circuit having calibration circuitry in accordance with one embodiment of the present invention.

Referring now to FIG. 5, shown is a block diagram of a circuit 100b which includes calibration circuitry. During normal operation, circuit 100b operates similar to that discussed above with regard to circuit 100 of FIG. 4. However, during calibration, calibration circuitry within circuit 100b may be used to calibrate phase detector 105.

In addition to the components discussed above in FIG. 4, circuit 100b further includes calibration circuitry, including a feedback loop that is closed during calibration from the output of ADC 150 to phase detector 105. The output of ADC 150 is provided to a LPF 132. The output of LPF 132 is inverted and gained up via a negative gain stage 134 to form a calibration signal. In one embodiment, LPF 132 and gain stage 134 may be implemented with a leaky integrator. In some embodiments the negative gain stage 134 may have a large gain, K, of over 1000. Thus the calibration signal may equal the negative average value of the ADC output multiplied by the gain, or $-K\overline{V_{ADC}}$.

The calibration loop may adjust the calibration signal so that the long-term average of the output ADC 150 is substantially zero. When calibration is complete, the calibration signal is stored as the phase adjust signal in a register 138. Accordingly, during normal operation the value of the phase adjust signal stored in register 138 may be provided to multiplier 130 of phase detector 105. In some embodiments, register 138 may be within a phase detector.

As further shown in FIG. 5, during calibration a ramp generator 165 may provide a signal to phase interpolator 170. This ramp signal may cause the sampling clock's phase to be continuously swept across an incoming data eye. In such manner, the phase adjust signal may be set so that the phase adjust signal multiplied by the error pulse equals the reference pulse (i.e., $P_{ADJ} \cdot I_{err} = I_{ref}$), and the long-term average of the filtered ADC output is forced to zero. While shown with a separate ramp generator 165, in some embodiments a value of one may be input into digital filter 160 to replicate such a ramp signal.

During calibration, if there are no offsets in phase detector 105 and the sampling phase has a uniform distribution, the average values of $I_{err}$ and $I_{ref}$ are equal, and the output of ADC 150 is zero. However, if there is an offset present in phase detector 105, the calibration loop will adjust the calibration signal until the output of ADC 150 equals zero (or substantially zero, meaning that the value may be zero or very close to zero). This calibrated phase adjust signal is then stored in register 138 for use in normal operation.

Sufficient data transitions from an incoming data eye are used to implement this phase calibration loop. Thus, an analysis of data transitions may be performed to ensure that a sufficient number of data transitions occur. In one embodiment, a transition detector may be provided to analyze the incoming data and determine whether sufficient transitions are occurring.

Figure 6:
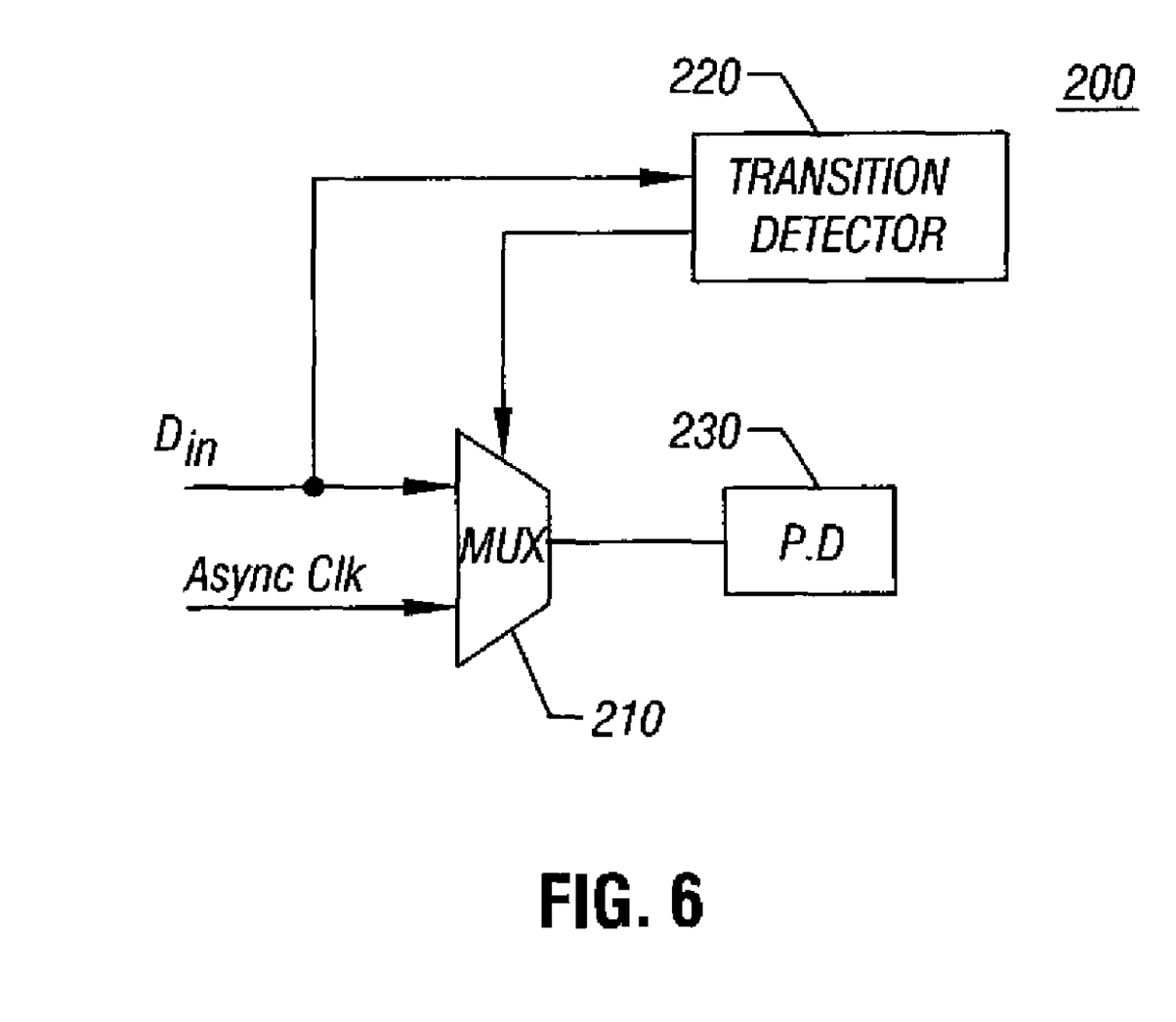
FIG. 6 is a block diagram of a transition circuit in accordance with one embodiment of the present invention.

Referring now to FIG. 6, shown is a block diagram of a transition circuit 200 in accordance with one embodiment of the present invention. The incoming data (Din) is passed through a multiplexer (MUX) 210 to a phase detector 230 (which may correspond to phase detector 105 of FIG. 4), assuming sufficient transitions are occurring. As shown in FIG. 6, transition circuit 200 may further include a transition detector 220 coupled to receive the incoming data. Transition detector 220 may compare the number of transitions occurring to a predetermined threshold. For example, a 10% threshold may be set and transition detector 220 may generate a low transition signal that is provided to MUX 210 if sufficient transitions are not occurring.

Accordingly, if insufficient transitions are occurring the low transition signal enables MUX 210 to insert an asynchronous clock into phase detector 230 in place of the incoming data to simulate data transitions. In some embodiments, to reduce loading on a high-speed data path, the asynchronous clock may be multiplexed in through a slice input of an associated limit amplifier. To reduce the load further, a bit error rate (BER) sampler already present in a CDR may be used to perform transition detections.

Figure 7:
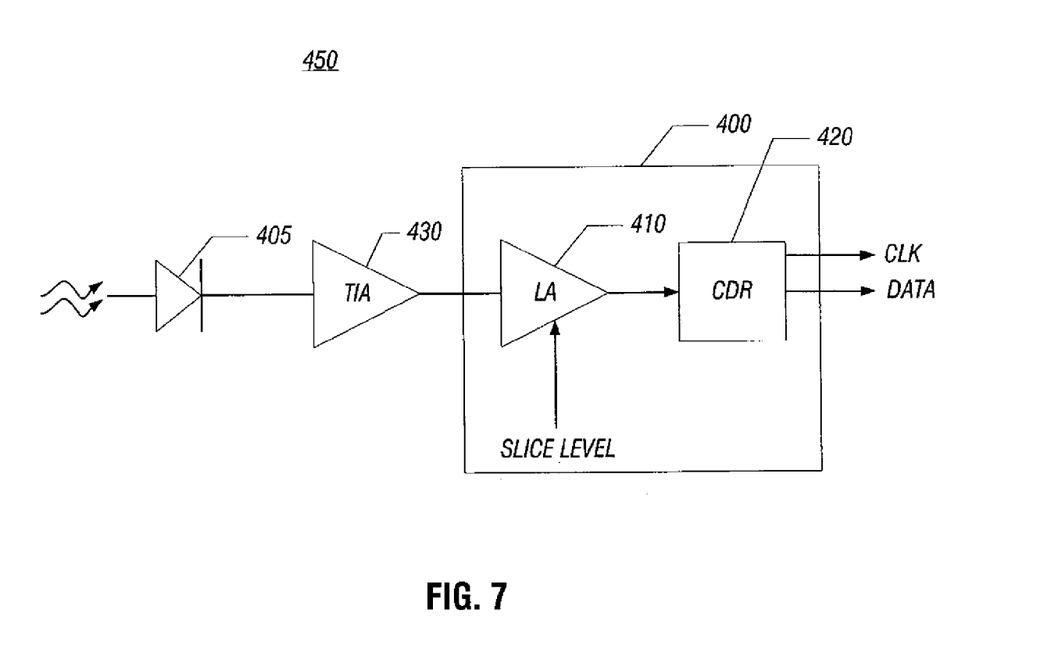
FIG. 7 is a block diagram of a portion of a system in accordance with one embodiment of the present invention.

Referring now to FIG. 7, shown is a block diagram of a portion of a system in accordance with one embodiment of the present invention. System 450 may be a part of an optical system, such as an optical receiver. As shown in FIG. 7, system 450 receives incoming optical signals, which may be obtained from an optical fiber or other such source via a photodetector 405, which converts the incoming optical energy into electrical current. Then, a transimpedance amplifier (TIA) 430 may convert the electrical current into voltage signals. From the output of TIA 430, voltage signals are provided to an integrated circuit 400 as an incoming data stream. As shown in FIG. 7, integrated circuit 400 may include a LA 410 and a CDR 420. Specifically, the incoming data may be provided to LA 410 for amplification. As shown in FIG. 7, a slice level offset signal (SLICE LEVEL) may be provided to give a desired offset adjustment value to limit amplifier 410. For example, the slice level offset may be referred to a front-end gain block of limit amplifier 410.

The output of LA 410 is provided to CDR 420. As an example, CDR 420 may include the circuits of FIGS. 4 and 5. Accordingly, CDR 420 may generate outputs including recovered data (DATA) as well as a recovered clock signal (CLK).

While shown with the particular components present in FIG. 7, it is to be understood that a system in accordance with an embodiment of the present invention may include additional components, and the components present in FIG. 7 may be differently arranged. For example, while integrated circuit 400 is shown to include a LA and a CDR, such components may be in different packages in other embodiments and, of course, additional components may be present in integrated circuit 400.

In certain embodiments, calibrations to reduce or remove phase offsets and set a desired gain may be effected using software (or a combination of software, firmware and hardware) that may be executed within a system, such as a receiver, CDR, or other component. Such embodiments may include an article in the form of a machine-readable storage medium onto which there are stored instructions and data that form a software program to perform such methods.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
sweeping a phase of a sampling clock across a data eye during calibration of a phase detector;

filtering a value corresponding to an output of the phase detector;

inserting a calibration signal corresponding to the filtered value into the phase detector;

adjusting the calibration signal until the filtered value is substantially zero; and storing a phase adjust value corresponding to the adjusted calibration signal.

2. The method of claim 1 further comprising applying the phase adjust value to the phase detector.

3. The method of claim 1, further comprising simulating data transitions for incoming data to the phase detector during calibration.

4. The method of claim 3, further comprising simulating the data transitions if actual data transitions are below a predetermined value.

5. The method of claim 4, further comprising measuring the actual data transitions using an error sampler.

6. An apparatus comprising:
- a phase detector to generate a phase detector pulse and sweep a phase of a sampling clock across a data eye during calibration of the phase detector;
- an analog-to-digital converter (ADC) coupled to receive the phase detector pulse;
- a calibration loop coupled to receive an output of the ADC and to generate a phase adjust value to remove an offset between a reference current and an error current corresponding to the phase detector pulse; and
- a storage to store the phase adjust value.

7. The apparatus of claim 6, wherein the phase adjust value is to force an average value of the ADC output to be substantially zero.

8. The apparatus of claim 6, wherein the calibration loop comprises:
- a filter to receive the ADC output; and
- an inverting gain stage coupled to an output of the filter.

9. The apparatus of claim 6, wherein the phase detector comprises a multiplier to combine the phase adjust value with an error pulse or a reference pulse.

10. The apparatus of claim 6, further comprising a multiplexer coupled to the phase detector to provide incoming data or an asynchronous clock to the phase detector.

11. The apparatus of claim 10, wherein the multiplexer is to provide the asynchronous clock to the phase detector if the incoming data has less than a predetermined amount of transitions.

12. The apparatus of claim 6, wherein the phase detector comprises:
- a first latch to receive incoming data and having a first delay; and
- a delay element to receive the incoming data, the delay element unmatched to the first delay.

13. A system comprising:
- an amplifier to receive optical energy and convert the optical energy to electrical energy;
- a phase detector coupled to the amplifier to receive and sweep a phase of a sampling clock across a data eye during calibration of the phase detector, and generate a phase detector pulse obtained from an error pulse and a reference pulse;
- an analog-to-digital converter (ADC) coupled to receive the phase detector pulse;
- a calibration loop coupled to receive an output of the ADC and to generate a phase adjust value; and
- a transition detector to detect an amount of data transitions during the calibration.

14. The system of claim 13, wherein the phase adjust value is to force a filtered value of the ADC output to be substantially zero.

15. The system of claim 13, wherein the phase detector comprises:
- a first latch to receive incoming data and having a first delay; and
- a delay element to receive the incoming data, the delay element unmatched to the first delay.

16. The system of claim 13, further comprising a multiplexer to receive a control signal from the transition detector and to select incoming data or a transition simulator for input into the phase detector.

* * * * *